United States Patent [19]
Moiseev

[11] Patent Number: 5,226,299
[45] Date of Patent: Jul. 13, 1993

[54] HEAT-INSULATING MEANS OF CRYOGENIC OBJECTS AND METHOD FOR PRODUCING OF COOLED RADIATION SHIELDS THEREOF

[76] Inventor: Sergei B. Moiseev, Leninsky prospekt, 52, kv. 281, Moscow, U.S.S.R.

[21] Appl. No.: 623,887
[22] PCT Filed: Apr. 28, 1989
[86] PCT No.: PCT/SU89/00114
  § 371 Date: Dec. 26, 1990
  § 102(e) Date: Dec. 26, 1990
[87] PCT Pub. No.: WO90/13770
  PCT Pub. Date: Nov. 15, 1990

[30] Foreign Application Priority Data
Dec. 11, 1984 [SU] U.S.S.R. ............... 3822142

[51] Int. Cl.$^5$ ............... F17C 3/10; F28F 3/12
[52] U.S. Cl. ............... 62/45.1; 62/48.3; 29/890.042; 165/168
[58] Field of Search .............. 62/45.1, 48.1, 48.3, 62/55.5, 50.5, 50.7, 51.1; 165/139, 168, 169, 170, 168; 29/890.042

[56] References Cited
U.S. PATENT DOCUMENTS

| | | | |
|---|---|---|---|
| 2,845,695 | 8/1958 | Grenell | 29/890.042 |
| 3,086,559 | 4/1963 | Grenell | 29/890.042 |
| 3,097,084 | 7/1963 | Putnam | 62/45.1 |
| 3,200,480 | 8/1965 | Heuer | 29/890.042 |
| 3,274,788 | 9/1966 | Hoffman et al. | 62/45.1 |
| 3,668,880 | 6/1972 | Gille | 62/45.1 |
| 3,782,128 | 1/1974 | Hampton et al. | 62/45.1 |
| 3,895,497 | 7/1975 | McIntosh et al. | 62/45.1 |
| 4,145,892 | 3/1979 | Skakunov et al. | 62/45.1 |
| 4,209,885 | 7/1980 | Winter | 29/890.042 |
| 4,370,868 | 2/1983 | Kim et al. | 62/515 X |
| 4,492,088 | 1/1985 | Ibrahim et al. | |
| 4,727,724 | 3/1988 | Intichar et al. | 62/55.5 |
| 4,918,927 | 4/1990 | Eigenbrod | 62/45.1 |

FOREIGN PATENT DOCUMENTS
2361360 9/1979 Fed. Rep. of Germany.
1569965 6/1969 France.

OTHER PUBLICATIONS
"Kriegennaya Tekhnika", E. I. Mikulin, 1969.

Primary Examiner—Henry A. Bennet
Assistant Examiner—C. Kilner
Attorney, Agent, or Firm—Burgess, Ryan & Wayne

[57] ABSTRACT

The invention relates to cryogenic engineering.

The heat-insulating means of cryogenic objects is a bank of cooled radiation shields (2) arranged coaxially with the cryogenic object, i.e. vessel (4), provided with heat-exchange channels (6) which intercommunicate through connecting pipes (7). The entire bank of shields (2) is made as an integral whole, the channels (6) being located in the body of the shields (2). The bank of shields (2) is made of a multilayered strip with a pattern of the development of the entire bank of shields (2) applied to it. Then a system of channels (6) and connecting pipes (7) is created between the strip layers in compliance with the pattern. Then the development is cut out and formed into a bank, arranging the shields (2) coaxially with pipes (7) therebetween. The heat-insulating means is intended primarily for use in vessels for storage of cryogenic fluids.

4 Claims, 5 Drawing Sheets

HEAT-INSULATING MEANS OF CRYOGENIC OBJECTS AND METHOD FOR PRODUCING OF COOLED RADIATION SHIELDS THEREOF

FIELD OF ART

The present invention relates to cryogenic engineering and, more particularly, it relates to the heat-insulating means of cryogenic objects, such as cryostats, Dewar flasks, cooled apparatus, and to the method for producing of a bank of radiation shields for the realization of such means.

PRIOR ART

Known in the prior art is a heat-insulating means of cryogenic objects, made in the form of a bank of passive shields arranged in line, one after another, on the path of heat radiation directed towards the cryogenic objects (DE, B, 2361360). The shields in this means have the form of coaxial cylinders arranged on the outside of a vessel with cryogenic fluid and secured to the filler throat of said vessel. The shields are cooled with cold gas discharged through the vessel throat from the cryogenic fluid.

However, the cooling efficiency of such means is low because each passive shield reduces the inflow of heat twice only and the heat exchange surface of the means is limited by the internal surface of the vessel filler throat.

There is another known heat-insulating means of cryogenic objects in the form of a cooled radiation shield provided with heat exchange channels for the flow of coolant, said channels being located between the shield layers (U.S. Pat. No. 4,492,088).

In this means the heat exchange is increased between the shield and cold gas since the latter is discharged not through the throat but through the heat exchange channels located between the shield layers. However, the cooling efficiency of this means is likewise low because the shield is made in the form of a single envelope to which the inlet and outlet pipes have to be soldered.

Finally, there is a known heat-insulating means for cryogenic objects in the form of a bank of six cooled radiation shields, said shields shaped like cylinders with flat end faces arranged coaxially one after another on the path of heat radiation, each provided with heat exchange channels for the flow of coolant, said channels communicating through connecting pipes (SU, A, 1180640). The heat exchange channels in the known means have the form of helical flattend pipes soldered to the face surface of each shield. The heat exchange channels intercommunicate through the connecting pipes also soldered to the ends of the spiral pipes. The cold vapours of cryogenic agent-liquid helium (coolant)-flow from the helium container into the system of heat exchange channels and cool the radiation shields. The advantages of this means include the rational utilization of enthalpy of the vapour released by the cryogenic agent-helium, and the relationship between the thermal load on the cryogenic agent and efficiency of heat insulation. The heavier the load, the more intensive is evaporation of helium and the better is the cooling of the shields which reduces the evaporation intensity of helium. The thermal contact of each shield with the structural connectors between the casing and the vessel reduces substantially the inflow of heat due to heat conductivity.

However, at the same time, the heat exchange between the coolant flowing through the channels and the surfaces of the shields is insufficiently effective because the coolant cools at first the channels proper, then the layer of solder and only afterwards it cools the surfaces of the shields which creates a thermal resistance. The coil-type heat exchanger made of a pipe with a constant passage area is not optimum from the view point of hydraulics and heat transfer because increasing the length of the heat exchanger in order to increase the cooled surface of the shields results in a higher hydraulic resistance of the cryogenic agent flowing through the pipe.

The limited area of the cooled end surfaces of the shields results in heating of the noncooled portion of the shields or in the necessity of making the shields from costly and heavy copper. An increase in the passage area of the pipe brings about a stronger heat inflow to the helium vessel due to heat conductivity along the pipe. On the other hand, the parameters of coolant change as it flows through the system of heat exchange channels. While the coolant is being heated, the specific volume of gas increases almost proportionately to its temperature. Hence, if the passage area of the pipe is selected taking in account the permissible hydraulic resistance on its warm end, its cold end will have a larger passage area which will also bring about a stronger inflow of heat to the helium vessel due to heat conductivity along the pipe.

A method for production of the known heat-insulating means for cryogenic objects comprises making the blanks of the shields by cutting them from a sheet material, providing them with heat exchange channels by soldering a flattened pipe to their surface, arranging said pipe spirally on the corresponding portion of the surface of the shield blanks, connecting the channels of all the blanks in succession, by soldering connecting pipes to the ends of the channels of the adjacent blanks then the produced shields, into a bank, arranging them nearly parallel (coaxially) to each other and placing connecting pipes in the intervals between the shields. This method is noted for technological complexity and requires a large number of soldered joints carried out manually. Besides, soldering pollutes the surface of the shields, develops leaks in case of temperature deformations, and liberates gases in vacuum.

SUMMARY OF THE INVENTION

The main object of the invention resides in providing a heat-insulating means of cryogenic objects with cooling shields designed so as to ensure direct contact of the coolant with the material of the shield throughout its surface and permit dispensing with the soldered joints between the channels and connecting pipes and developing a method for the production of such a heat-insulating means which would be simple technologically and would yield itself to automation of the process.

This object is attained by providing a heat-insulating means of cryogenic objects in the form of at least one bank of cooled radiation shields arranged in tandem on the path of heat radiation to the cryogenic object, each having channels for the flow of coolant, communicating successively from one shield to another through connecting pipes wherein, according to the invention, each bank of radiation shields is made of a continuous multi-layered strip consisting of several main portions corresponding to the number of shields in the bank with a system of through channels between the strip layers, and intermediate portions between the main ones, each having at least one channel functioning as a connecting pipe.

It is practicable that the passage area through the connecting pipes should have a variable size, increasing proportionately to the growth of coolant temperature.

This object if achieved also by providing a method for production of a bank of cooled radiation shields for the heat-insulating means of cryogenic objects consisting in making the blanks of the shields of the bank, providing the shields with heat exchange channels, connecting them successively from one blank to another by connecting pipes and assembling a bank from the produced shields, arranging said shields nearly parallel to one another and connecting pipes in the gaps between the shields wherein, according to the invention, the material of the bank of shields is constituted by a multilayered strip with channels between the layers, then a development of the entire bank is cut out of the strip, said development containing simultaneously the blanks of all the shields with channels and connecting pipes and forming a bank from the development, making the channels in the strip within the limits of the development, throughout its area.

The heat-insulating means of cryogenic objects realized in accordance with the present invention ensures direct thermal contact between the coolant and the shield material with a complete absence of soldered joints which permits increasing substantially the utilization of the shield material and replacing the materials with a high heat conductivity coefficient, such as copper by lighter and cheaper materials, e.g. aluminum alloys.

The method for producing a bank of radiation shields for the heat-insulating means of cryogenic objects according to the invention makes it possible to automate the operation of cutting out the development of the shield bank simultaneously with heat exchange channels and connecting pipes, and of assembling the shields into a bank, thereby stepping up productivity, and is technologically simple.

BRIEF DESCRIPTION OF THE DRAWINGS

Now the invention will be described by way of examples with reference to the drawings, in which.

BEST MODE OF CARRYING OUT THE INVENTION

Figure 1:
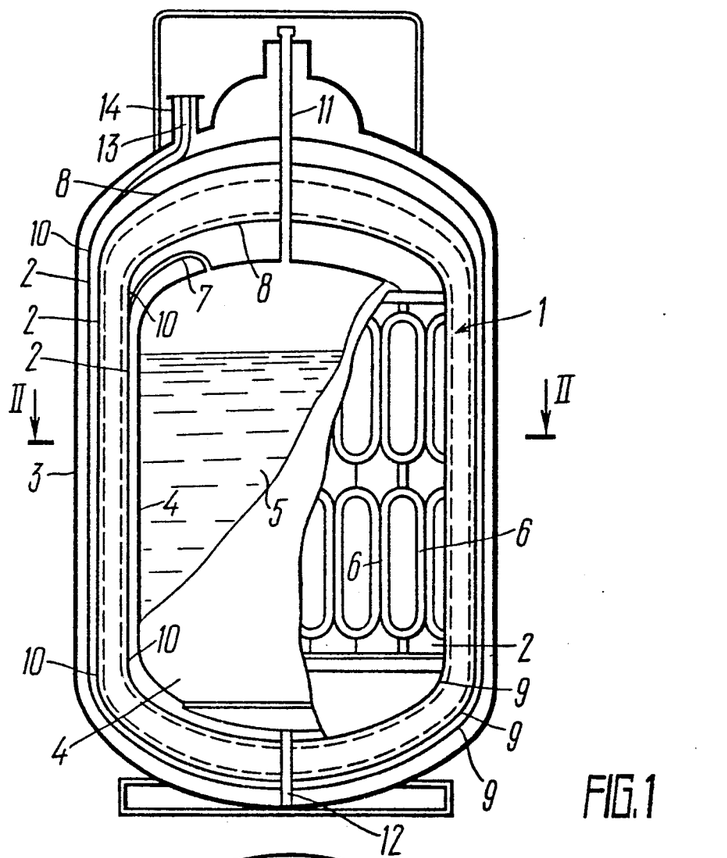
FIG. 1 is a schematic diagram of a cylindrical reservoir for storage of cryogenic liquids with a heat-insulating means according to the invention, longitudinal section.
Figure 2:
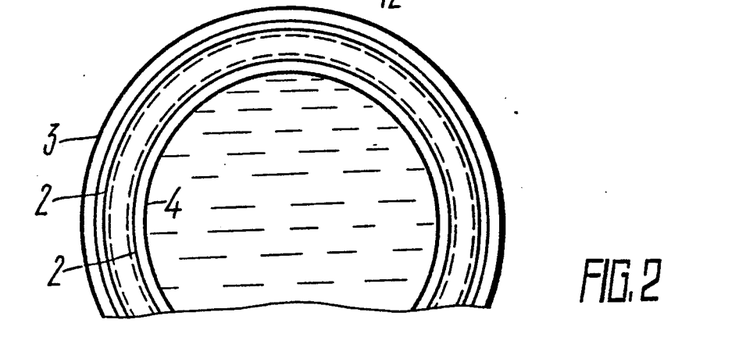
FIG. 2 is a section taken along line II—II in FIG. 1.

Shown in FIGS. 1 and 2 is the cylindrical reservoir for storage of cryogenic fluids provided with a heat-insulating means 1 in the form of one bank of cooled radiation shields 2 arranged in tandem on the path of heat radiation from the casing 3 of the reservoir to the vessel 4 with cryogenic fluid 5. Each cooled radiation shield 2 has channels 6 for the flow of coolant, in this case vapours of cryogenic fluid 5. The channels 6 of one shield 2 are communicated with the channels 6 of another shield 2 consecutively by connecting pipes 7. All the shields 2 of the bank of cooled radiation shields, channels 6 and connecting pipes 7 are made integrally from a whole multilayered (two-layered in this particular case) strip having main portions corresponding in number to the number of shields 2 in the bank with a developed network of channels 6 between the layers of the strip, and intermediate portions between the main ones having, each, one channel which performs the functions of a connecting pipe 7. The connecting pipes 7 have passage areas of a variable size which increases proportionately to the growth of coolant temperature. Each shield 2 has a cylindrical shape, said cylinders being arranged coaxially. The connecting pipes 7 are located in the gaps between the shields 2. Each cooled radiation shield 2 has upper and lower bases 8 and 9, respectively, which function as noncooled shields, the connection 10 of the cylindrical portions with the bases 8, 9 ensuring an efficient thermal contact therebetween. To enhance the efficiency of the heat insulating means, each shield 2 can be coated with multilayered insulation, e.g. electrovacuum insulation (not shown in the drawings). The vessel 4 is secured to the casing 3 by means of a filler throat 11 and a support 12. The connecting pipe 7 of the inner end shield 2 is connected to the vessel 4 while the connecting pipe 13 of the outer end shield 2, with the outlet pipe 14.

Figure 3:
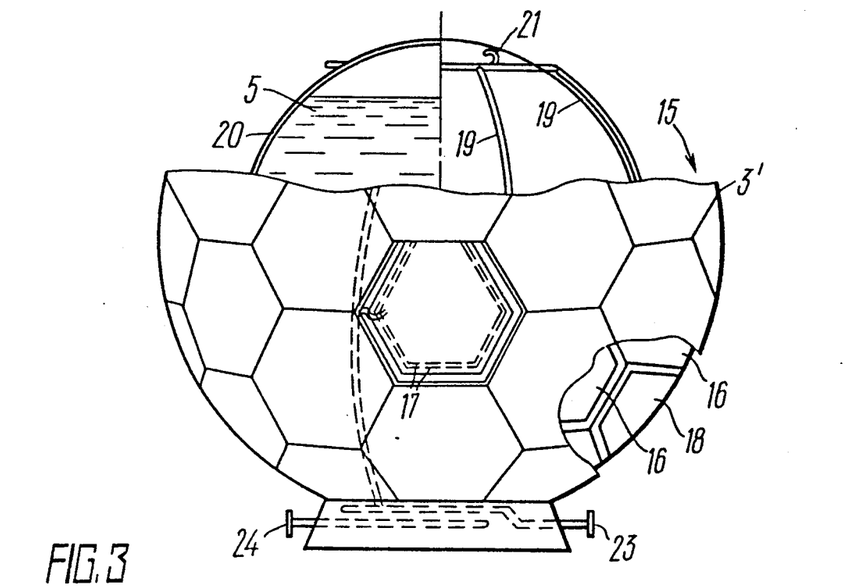
FIG. 3 is a spherical reservoir for storage of cryogenic liquids with a heat-insulating means according to the invention with partially cut-away views.
Figure 4:
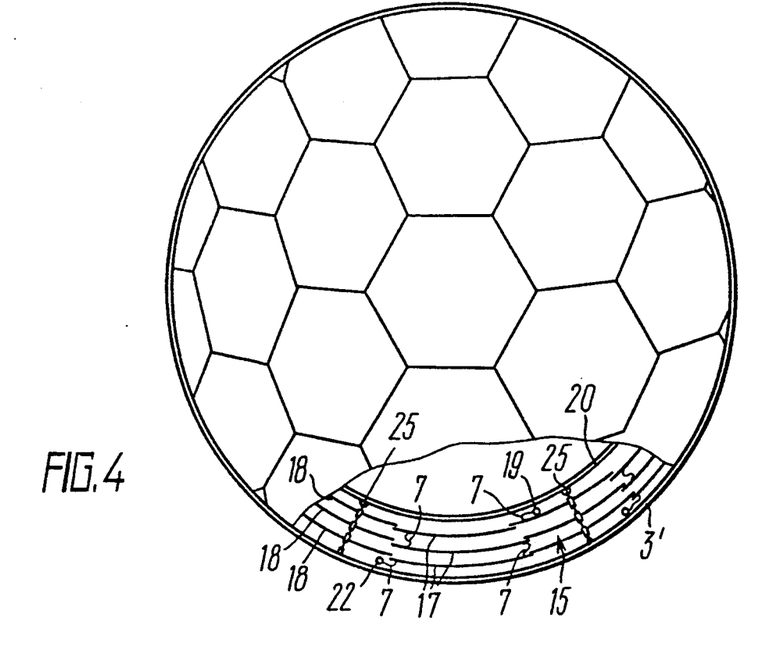
FIG. 4 is a top view of FIG. 3.

Shown in FIGS. 3, 4 is a version of the spherical reservoir for storage of cryogenic fluids wherein the heat-insulating means 15 has a spherical shape and comprises a plurality of banks 16 of cooled radiation shields 17 of a hexagonal shape, alternating with a plurality of noncooled (passive) radiation shields 18 of the same shape. The connecting outlet pipes of all the inner cooled endshields 17 are connected to the internal main network 19 communicating with the upper part of the spherical vessel 20 through a pipe 21. The connecting pipes 7 of all the outer cooled shields 17 are in communication with the outer main network 22 which, in turn, communicates with the outer pipe 23. In each bank 16 the shields 17, connecting pipes 7 and heat exchange channels are made as an integral whole. A pipe 24 is provided for filling and draining the cryogenic agent 5.

The vessel 20 is held to the casing 3 by means of tension members 25 passing through non-cooled shields 18.

The method for production of the bank of cooled radiation shields comprises making the blanks of the bank shields, providing the shields with heat exchange channels, putting them in communication consecutively from one blank to another, by means of connecting pipes, and assembling the produced shields into a bank, arranging the shields in line nearly parallel to one another and providing connecting pipes in the gaps between the channels. The material of the shield bank is constituted by a multilayered (two-layered in this case) strip 26 (FIG. 5) with channels 6 arranged between the layers. The channels 6 are formed by applying a pattern to one of the layers of the strip 26.

The pattern is applied by using a paint which prevents adhesion of the structure layers when the latter are connected to one another after which the layers are welded to each other then the channels are bulged by feeding gas or liquid under pressure into the unwelded intervals of the strip layers in accordance with the pattern.

Figure 5:
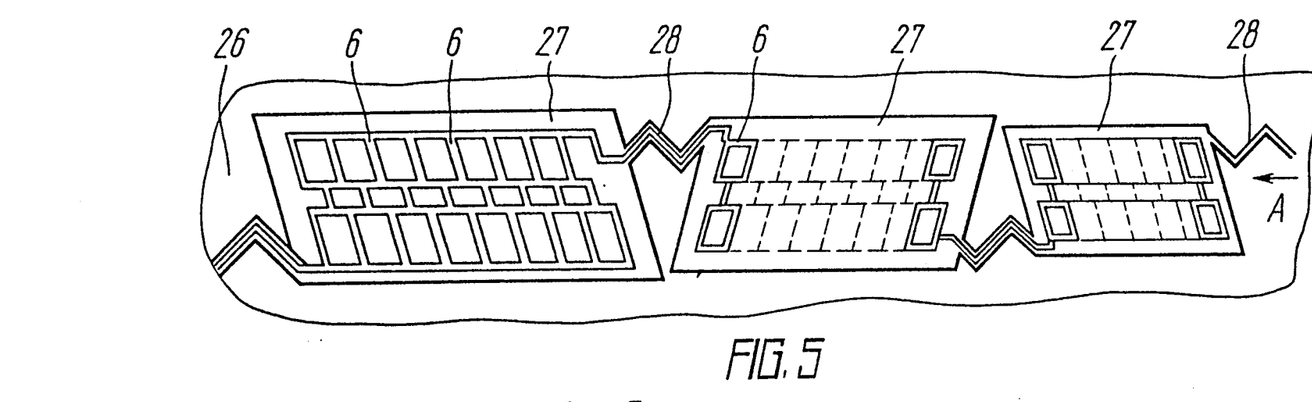
FIG. 5 is a multilayered structure with contours of the development of the shield bank with connecting pipes and channels.
Figure 6:
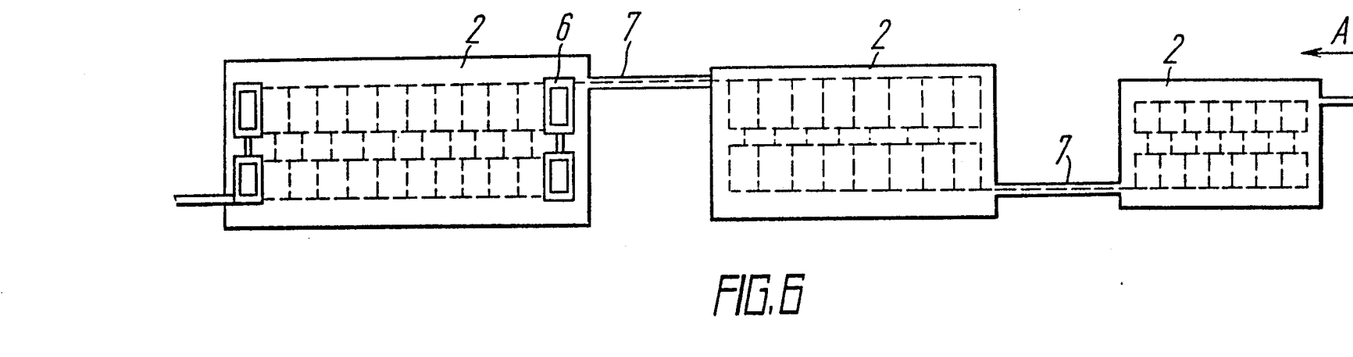
FIG. 6 is a development of the shield bank for the cylindrical reservoir intended to store cryogenic fluids, illustrated in FIGS. 1, 2.
Figures 7, 11, 12, 13:
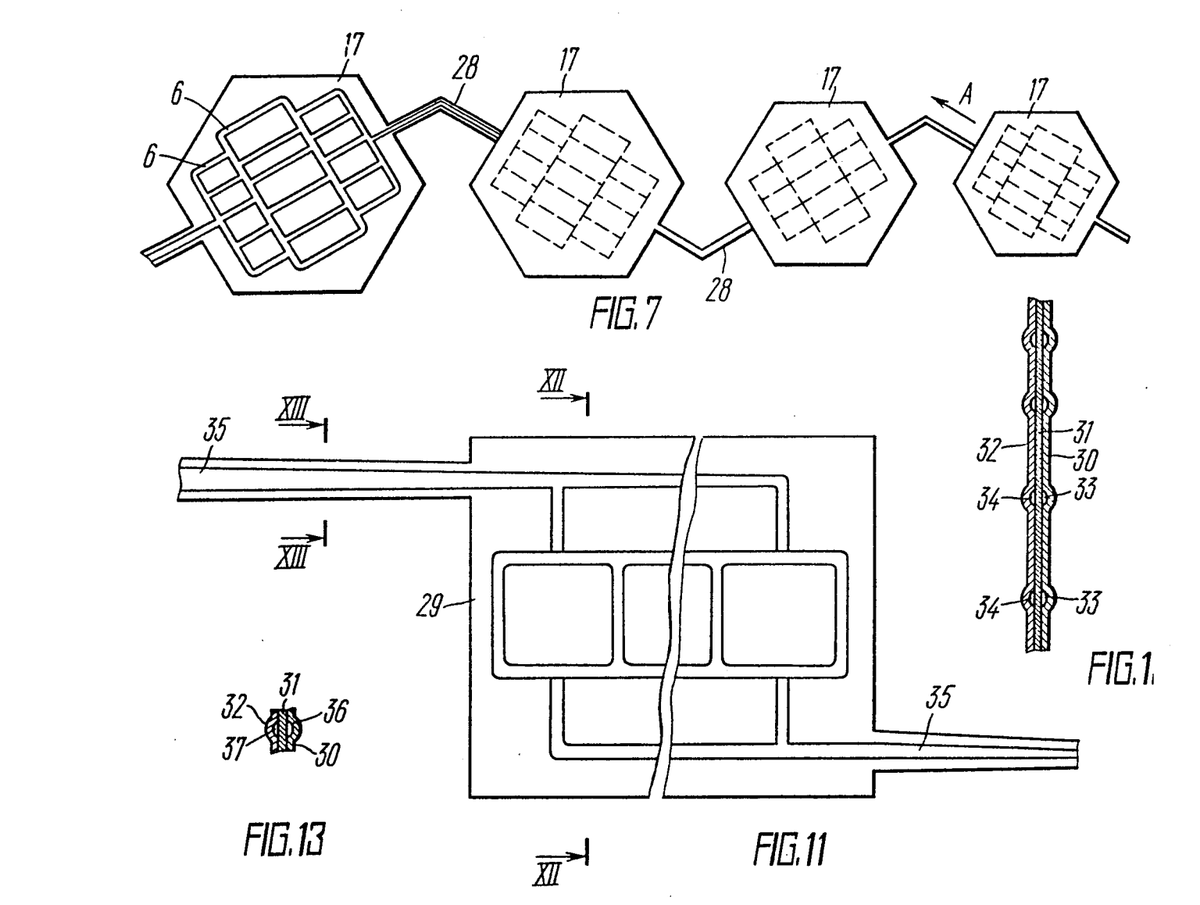
FIG. 7 is a development of the shield bank for the spherical reservoir intended to store cryogenic fluids, illustrated in FIGS. 3, 4.
FIG. 11 is a development of the bank of cooled radiation shields according to the invention for the low-temperature part of a cryogenic refrigerator acting simultaneously as the heat-exchange unit of the same refrigerator.
FIG. 12 is a section taken along line XII—XII in FIG. 11.
FIG. 13 is a section taken along line XIII—XIII in FIG. 11.

The pattern of the channels is applied so that the channels 6 would cover the entire area of the main portions 27 whose number corresponds to that of the shields 2 and would be located at least one on the intermediate portions, would ensure efficient heat exchange of the coolant with the shield surface and would abstract heat uniformly over its surface. The passage area through the channels 6 on the surface of the shield is selected with the purpose of reducing as much as possible the hydraulic resistance to the flow of coolant and the heat conduction over the connecting pipes 7 to the vessel 4. The flow area of the connecting pipes 28 whose function is performed by the channels of the intermediate portion, and the length of the connecting pipes 26 are selected with a view to ensuring a maximum reduction of the hydraulic resistance to the moving flow of coolant and a minimum heat inflow due to heat conduction through connecting pipes 28 from the warmer shields to the colder ones. The direction of coolant flow is shown in FIGS. 5, 6 and 7 by arrow A. As the coolant flows from one shield to another it is heated and, if the coolant is, for example, vapours of liquid helium-4 contained in the vessel 4, their specific volume grows many times over. To optimize the characteristics of the connecting pipes 28, they are made with the flow area of a variable size, increasing proportionately to the growth of coolant temperature. Thus, if the vapours of liquid helium-4 boiling at atmospheric pressure are heated from 4.2K to 300K by 71.4 times, the flow area of the connecting pipes 28 should change by 7 times approximately.

The development of the bank of cooled shields is cut out, e.g. by the plasma or laser method from the multilayered strip 26 on a program with introduced information on the shape of the development. The blanks of the shields 2 for the cylindrical reservoir shown in FIGS. 1, 2 are shaped like rectangles as shown in FIG. 6 or parallelepipeds as shown in FIG. 5 while the blanks of the shields for the spherical reservoir shown in FIGS. 3, 4 have the shape of hexagons as illustrated in FIG. 7. The connecting pipes 7 (FIG. 6) are made either straight or, for the sake of economy of material, of a zig-zag shape (pipes 26 in FIG. 5, 7). The material for making the multilayered strip 26 is stainless steel, aluminium alloys, foil-coated plastics and other materials yielding themselves to the kind of treatment described above. The external surfaces of the multilayered strip 26 are polished or coated with a light-reflecting film by spraying. Then the pressuretightness of channels 6 is checked with a leak detector. At this stage of assembly the pressuretightness control can be carried out more efficiently than on the assembled reservoir.

The technology of further assembly of the heat-insulating means will now be considered by describing an example of assembly of a cylindrical reservoir for storage of cryogenic fluids illustrated in FIGS. 1, 2. Two versions of the development of the shield blanks for the cylindrical vessel are illustrated in FIGS. 5, 6. Let us consider the process of assembling the cylindrical reservoir using the development shown in FIG. 6. The connecting pipe 7 (FIG. 8) of the inner end shield 2 is tightly welded or soldered to the vessel 4. Then the first shield 2 is made cylindrical, for example on a mandrel, arranging it coaxially to the vessel 4 and interconnecting the vertical edges of the shield 2 by resistance welding or with a screw joint. The latter type of joint allows the means to be made dismountable, for example for repairs or replacement of the vessel 4. This joint must be sufficiently tight and be inpermeable to heat radiation. The upper and lower edges of the shield 2 are fastened to the upper and lower bases 8 and 9 (FIG. 1), respectively, by a method ensuring efficient thermal contact, said bases functioning as passive (noncooled) radiation shields. The upper base 8 is in turn fastened to the filler throat 11 while the lower base 9, to the support 12. Then the shield 2 may be coated with multilayered heat insulation, e.g. shield-vacuum insulation. The multilayered heat insulation increases the efficiency of the heat-insulating means but involves long-time pumping out for vacumizing the reservoir after its assembly. Therefore, the use of multilayered heat insulation is justified in cryogenic objects which are not dismounted in service, e.g. in reservoirs for the storage of liquids. When manufacturing cryostats and experimental cryogenic apparatuses requiring frequent disassembly it is good practice to dispense with multilayered heat insulation and provide a larger number of cooled radiation shields 2 in the bank.

Figures 8, 9, 10:
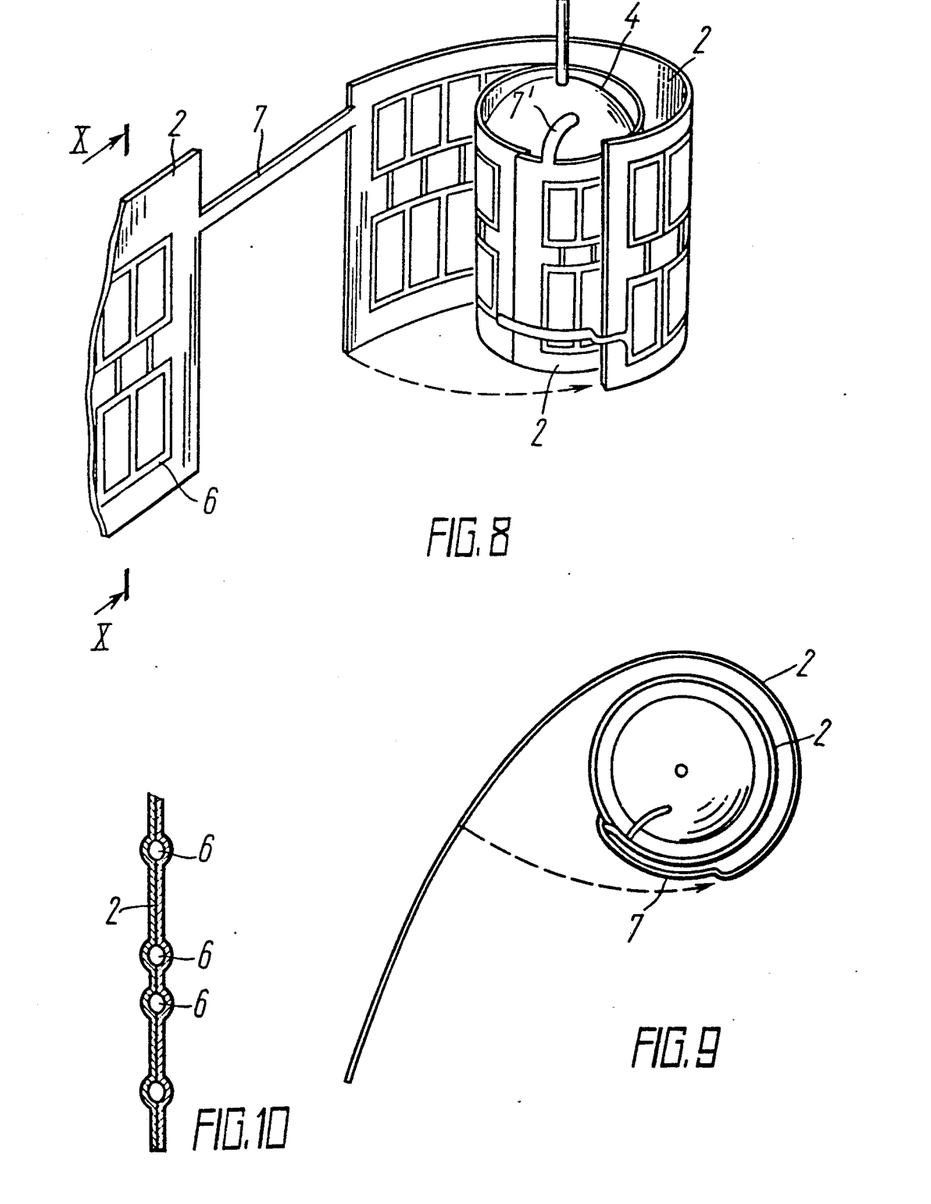
FIG. 8 is the bank of shields whose development is shown in FIG. 6 in the course of assembly of the heat-insulating means, isometric view.
FIG. 9 is a top view of the shield bank shown in FIG. 8.
FIG. 10 is a section along line X—X in FIG. 8.

Then follows the assembly of the next cooled radiation shield 2 by imparting the cylindrical shape thereto and joining its vertical edges. The second shield 2 is arranged coaxially with the first one. The connecting pipe 7 between the first and second cooled shields 2 must be bent so as to place it inside the gap between the shields 2 without contacting them, as shown in FIG. 9. Then the upper and lower bases are connected to the shield 2 and, of necessary, the multilayered heat insulation is applied in the manner described above.

The newt shields 2 are assembled in a similar way, arranging all of them coaxially. After assembling the last shield 2, the casing 3 (FIG. 1) is assembled and the connecting pipe 13 of the outer end shield 2 is connected to the outlet pipe 14. After the pressuretightness test the space between the outer wall of the vessel 4 and the inner wall of the casing 3 is vacuumized.

The reservoir for storage of cryogenic fluids provided with a heat-insulating means according to the invention functions as follows.

The vessel 4 of the reservoir is filled through filler throat 11 (FIGS. 1, 2) with a liquid cryogenic agent, e.g. liquid helium. The vapours of the cryogenic agent liberated in the course of filling and storage escape from the vessel 4 through the connecting pipes 7 and channels 6 located directly in the body of the shield 2 and cool the shields 2 which, in turn, abstract heat from the upper and lower bases 8 and 9. The latter prevent the propagation of heat due to heat conduction over the filler throat 11 and support 12. The filler throat 11 of the reservoir with stored cryogenic fluid should be closed.

The arrangement of channels 6 directly in the body of the shields 2 ensures direct heat exchange between the coolant flowing through the channels 6 and the material of the shields 2 thus permitting to reduce the heat resistance and increase the efficiency of heat exchange ensured by the heat-insulating means. The absence of soldered joints between the channels 6, connecting pipes 7 and shields 2 also permits increasing the efficiency of heat exchange, reliability of the means and simplifying its manufacturing technology. The variable size of the flow area through the connecting pipes makes it possible to diminish the inflow of heat through said pipes to the vessel 4.

The method for assembling the heat-insulating means of the reservoir for storage of cryogenic agents allows for automating a number of operations.

For an example, let us consider also a heat-insulating means and a method for manufacturing a spherical reservoir for the storage of cryogenic fluids illustrated in FIGS. 3, 4 and equipped with such a heat-insulating means. The heat-insulating means of said reservoir comprises a plurality of banks 16 of hexagonal cooled radiation shields 17, the development of one of them being illustrated in FIG. 7, and a plurality of banks 18 of passive shields.

The spherical reservoir equipped with a heat-insulating means according to the present invention is assembled as follows. The spherical vessel 20 provided with an internal main network 19 connected with the upper part of the vessel 20 by a pipe 21 is fastened with the aid of tension members 25 to the spherical cassing 3 assembled from hexagonal sections and having hexagonal auxiliary holes between the sections. First, the passive radiation shields 18 are installed through the auxiliary holes in the casing 3 between the vessel 20 and the sections of the casing 3. The passive radiation shields 18 also have a hexagonal shape.

The channels of the main network 19 pass over the edge of these holes. Connected to the network 19 is the connecting pipe 7 of the inner cooled end shield 17 and, after checking the joint for tightness, the first cooled radiation shield 17 is installed with a mat of multilayered insulation installed thereon, if necessary. The shield 17 is installed in the gap between the noncooled shields 18 and fastened over the periphery to the non-cooled shields 18 by a joint ensuring an efficient thermal contact. The next cooled radiation shield 17 is installed in the same manner parallel with the first one, taking care to see that the connecting pipe 7 is located in the gap between the shields 17.

The following cooled shields 17 are installed in a similar manner thus assembling the entire bank 16. The connecting pipe 7 of the outer end shield is secured tightly to the outer main network 22.

Then the hole is covered by the section 3 of a hexagonal shape. The sections of the casing 3 are joined by welding.

In the same way the banks 16 of cooled radiation shields are assembled in the other holes between the banks of the noncooled shields 18. The number and configuration of the holes depend on the required area of cooled radiation shields 17 and the design features of the reservoir. The reservoir is filled with cryogenic agent 5 and emptied through the pipe 24 connected with the lower part of the vessel 20. In the course of storage of the cryogenic agent the pipe is closed. The gaseous coolant-vapours of cryogenic agent 5 boiling in the vessel 20 is distributed through the pipe 21 over the internal main network 19 among the channels of the banks 16 of cooled radiation shields 17 where it gets through the connecting pipes 7 of the inner end shields 17. The cold gaseous cryogenic agent cools the radiation shields 17 which, in turn, cools the passive radiation shields 18 hindering the inflows of heat caused by radiation and heat inflow through tension members 25. Then the gaseous cryogenic agent enters the outer main network 22 which is connected with the outer pipe 23. The above-described heat-insulating means for the spherical vessel with cryogenic agent comprising a plurality of banks 16 of cooled radiation shields is noted for a high efficiency of heat exchange due to the absence of soldered joints and direct contact between the heat exchange channels and the material of the shields 17, also for simplicity of manufacture.

The heating-insulating means and a method for making a bank of cooled radiation shields for such a means may also be used for making other cryogenic apparatus and instruments, such as cryostats, cryogenic refrigerators, superconducting electric motors, generators, superconducting cables, electric energy storage units, superconducting magnets, etc.

For example, shown in FIGS. 11, 12, 13 is the development of a bank of cooled radiation shields 29 for heat insulation of the low-temperature portion of a cryogenic refrigeratir (not shown in the figure) which at the same time functions as the heat-exchange unit of the same refrigerator. In this case the bank of shields is made from a multilayered strip containing three layers 30, 31, 32 and forming the channels 33 between the layers 30 and 31, for the direct flow of coolant (compressed in the compressor and directed from the high-temperature to the low-temperature part of the refrigerator), channels 34 are formed between the layers 31 and 32 for the rereverse flow if coolant directed from the low-temperature part of the rtefrigerator to the compressor.

The connecting pipes 35 between the shields 29 are made from the same three-layer strip integral with the shields 29. Each connecting pipe 35 comprises two channels 36 and 37 arranged on either side of the structure layer 31.

The channels 36 and 37 have a variable flow area, said area of the channel 36 for the direct flow of coolant decreases with the reduction of its temperature along the coolant flow while the flow area of the channel 37 for the reverse flow of coolant increases along the flow of coolant. Such a heat-insulating means is assembled as described in the method for its manufacture according to the invention.

Due to the direct thermal contact of the coolant with the material of shields 29 this means is highly efficient and provides reliable heatprotection of the low-temperature portion of the refrigerator along with a high efficiency of heat exchange between the direct and reverse flows of coolant of the refrigerator, effected through th layer 31 of the structure.

The technology of assembly of this means dispenses with soldered joints, makes the means technologically simple and provides for automation of this process.

INDUSTRIAL APPLICABILITY

The heat-insulating means and a method for production of a bank of cooled radiation shields for such a means may be used for making heat insulation of cryogenic objects—cryostats, Dewar flasks, storage reservoirs for such liquid cryogenic agents as liquid helium, hydrogen, nitrogen, oxygen, etc., transport cryogenic reservoirs, super-conducting windings of electric motors, generators, electromagnets of electric energy storage units, superconducting cables.

The disclosed invention can also be used for making heat-exchange banks of helium, hydrogen, neon, nitrogen, oxygen refrigerators, air separators and other cryogenic installations.

I claim:

1. A heat insulating means for a cryogenic article, comprising:

a plurality of cooled radiation shields having a major surface and a minor edge, the major surface of the cooled radiation shields arranged parallel to each other in the path of heat radiation from a high temperature medium to the cryogenic articles, the radiation shields comprising a network of coolant flow channels arranged on the major surface of the heat shield and connecting channel means which connect the coolant flow channels of adjacent radiation shields in series at adjacent minor edges of the plurality of radiation shields;

the radiation shields and connecting channels means comprising a continuous multilayer strip of material comprising at least two layers of material having major surfaces, the at least two layers joined to each other along the major surfaces, to form the network of coolant flow channels and the connecting channel means located between the at least two layers, the connecting channel means comprise a variable free passage area increasing in relation to a rise in temperature of the coolant arranged integrally with the coolant flow channels on a portion of the continuous, multilayer strip of material having a width which is substantially smaller than a dimension of the major surface of the radiation shield; and each of the first and last of the radiation shields, arranged in the series, having one of an integrally arranged connecting channel means formed in the continuous multilayer strip adapted to connect the plurality of radiation shields to a source of coolant or to withdraw the coolant.

2. The heat insulating means of claim 1, wherein said coolant flow channel s comprise a variable free passage area increasing in relation to a rise of temperature of said coolant.

3. The heat insulating means of claim 1, wherein the continuous multilayer strip of material comprises a metal.

4. The heat insulating means of claim 3, wherein the metal is a metal slected from the group consisting of copper and aluminum.

* * * * *